United States Patent
Yu et al.

(10) Patent No.: US 11,962,539 B2
(45) Date of Patent: Apr. 16, 2024

(54) TECHNIQUES IN ADAPTIVE IN-SYNC AND OUT-OF-SYNC CLASSIFICATION BASED ON CHANNEL PARAMETER ESTIMATION IN NEW RADIO

(71) Applicant: Apple Inc., Cupertino, CA (US)

(72) Inventors: Zhibin Yu, Unterhaching (DE); Hua Li, Beijing (CN); Qiming Li, Beijing (CN); Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 17/292,056

(22) PCT Filed: Oct. 16, 2019

(86) PCT No.: PCT/US2019/056587
§ 371 (c)(1),
(2) Date: May 7, 2021

(87) PCT Pub. No.: WO2020/096746
PCT Pub. Date: May 14, 2020

(65) Prior Publication Data
US 2021/0399863 A1    Dec. 23, 2021

Related U.S. Application Data

(60) Provisional application No. 62/757,440, filed on Nov. 8, 2018.

(51) Int. Cl.
*H04L 5/00*   (2006.01)
*H04B 17/14*  (2015.01)
*H04B 17/327* (2015.01)

(52) U.S. Cl.
CPC ........... *H04L 5/0058* (2013.01); *H04B 17/14* (2015.01); *H04B 17/327* (2015.01)

(58) Field of Classification Search
CPC ...... H04L 5/0058; H04B 17/14; H04B 17/327
See application file for complete search history.

(56) References Cited

U.S. PATENT DOCUMENTS

| 2015/0030037 A1 | 1/2015 | Ahn et al. |
| 2018/0115990 A1 | 4/2018 | Abedini et al. |

(Continued)

FOREIGN PATENT DOCUMENTS

| JP | 2018026662 A | 2/2018 |
| KR | 10-2015-0104620 A | 9/2015 |

(Continued)

OTHER PUBLICATIONS

International Search Report and Written Opinion of the International Searching Authority directed to related International Patent Application No. PCT/US2019/056587, dated Feb. 7, 2020; 11 pages.

(Continued)

*Primary Examiner* — Duc C Ho
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for performing radio link monitoring or beam failure detection (RLM/BFD) in, or related to, a new radio (NR) involved network. Various embodiments are directed to adaptive configuration of threshold values for in-sync and/or out-of-sync (IS/OOS) in the NR involved network and adequately performing RLM/BFD. Such RLM/BFD with adaptive IS/OOS configuration may improve measurement accuracy and system performance. Other embodiments may be described and claimed.

20 Claims, 7 Drawing Sheets

(56) References Cited

U.S. PATENT DOCUMENTS

| | | | |
|---|---|---|---|
| 2018/0205585 A1 | 7/2018 | Sadiq et al. | |
| 2018/0269950 A1 | 9/2018 | John Wilson et al. | |
| 2019/0090227 A1* | 3/2019 | Tsai | H04W 72/27 |
| 2019/0141691 A1* | 5/2019 | Kwon | H04W 72/12 |
| 2019/0165880 A1* | 5/2019 | Hakola | H04W 72/23 |

FOREIGN PATENT DOCUMENTS

| | | |
|---|---|---|
| WO | 2018-143776 A | 8/2018 |
| WO | 2018/174806 A1 | 9/2018 |
| WO | WO 2018/169636 A1 | 9/2018 |

OTHER PUBLICATIONS

3GPP; TSG RAN; WG1; Intel Corporation, Simultaneous Tx and Rx of physical channels and RS (Meeting No. 93), R1-1806509, Agenda Item No. 7.1.2.2.6, May 21-25, 2018; 10 pages.

3GPP; TSG RAN; WG1; Nokia, "Remaining details on QCL" (Meeting No. 90b), R1-1718769, Agenda Item No. 7.2.3.7. Oct. 9, 2017; 5 pages.

3GPP; TSG RAN; WG1; Intel Corporation, "Remaining Issues on Beam Management" (Meeting No. 94), R1-1808669, Agenda Item No. 7.1.2.3, Aug. 11, 2018; 16 pages.

Intel Corporation, "Summary of Offline Discussion for NR Radio Link Monitoring," 3GPP TSG RAN WG1 Meeting #93, Busan, South Korea, May 21-25, 2018, R1-1807853; 11 pages.

Chinese Office Action and Search Report directed to related Chinese Application No. 201980073125.8, with English-language machine translation attached, mailed Mar. 2, 2024; 16 pages.

Vivo, Remaining issues on RLM[online], 3GPP TSG RAN WG1 #93 R1-1806037, Internet <URL:http://www.3gpp.org/ftp/tsg_ran/WG1_RL1/TSGR1_93/Docs/R1-1806037.zip>, May 12, 2018, pp. 1-2.

Office Action for Japanese Patent Application No. 2022-150975, dated Nov. 29, 2023, 5 pages.

* cited by examiner

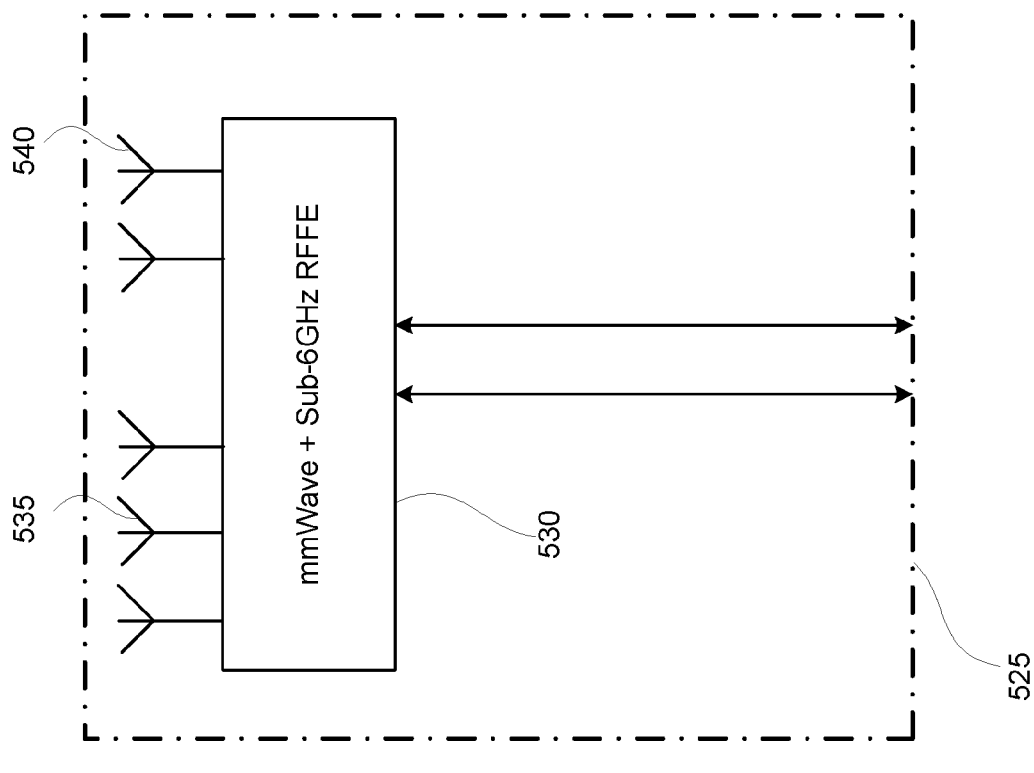
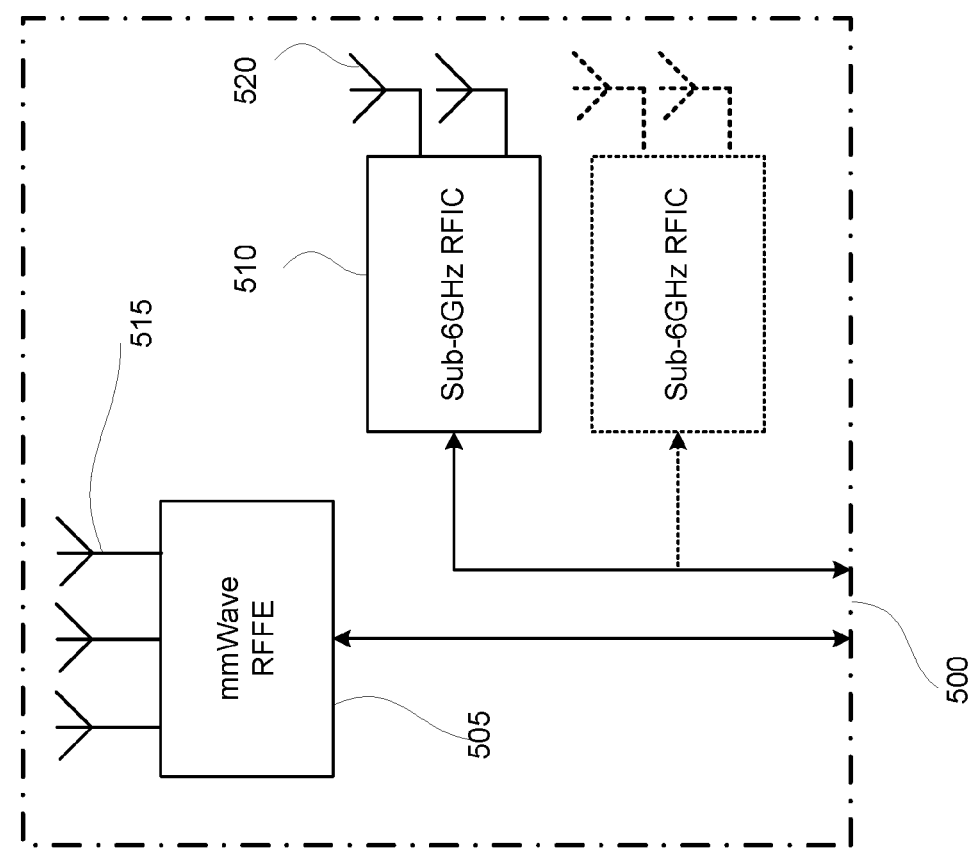
Figure 5A
Figure 5B

TECHNIQUES IN ADAPTIVE IN-SYNC AND OUT-OF-SYNC CLASSIFICATION BASED ON CHANNEL PARAMETER ESTIMATION IN NEW RADIO

CROSS REFERENCE TO RELATED APPLICATION

The present application is a National Stage entry from PCT/US2019/056587 filed on Oct. 16, 2019, entitled "Techniques in Adaptive In-sync and Out-of-sync Classification Based on Channel Parameter Estimation in New Radio," which claims priority to U.S. Provisional Patent Application No. 62/757,440, filed Nov. 8, 2018, entitled "Adaptive In-sync and Out-of-sync Classification Based on Channel Parameter Estimation Tracking Reference Signals in 5G Radio Link Monitoring and Beam Failure Detection all of which are hereby incorporated by reference in their entireties.

FIELD

Embodiments of the present invention relate generally to the technical field of wireless communications.

BACKGROUND

The background description generally presents the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In Fifth Generation (5G) New Radio (NR), radio link monitoring (RLM) and/or beam failure detection (BFD) may be performed based on a physical downlink control channel (PDCCH) hypothetical block error rate (BLER) estimation. However, such an estimation may be based on a non-coherent approach in NR instead of a coherent approach in long term evolution (LTE) technologies. This may cause inaccuracy in the BLER estimation, especially in channels with different fading effects. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5A illustrates an example radio frequency front end (RFFE) incorporating a millimeter Wave (mmWave) RFFE and one or more sub-millimeter wave radio frequency integrated circuits (RFICs) in accordance with some embodiments. FIG. 5B illustrates an alternative RFFE in accordance with some embodiments.

DETAILED DESCRIPTION

Figure 1:
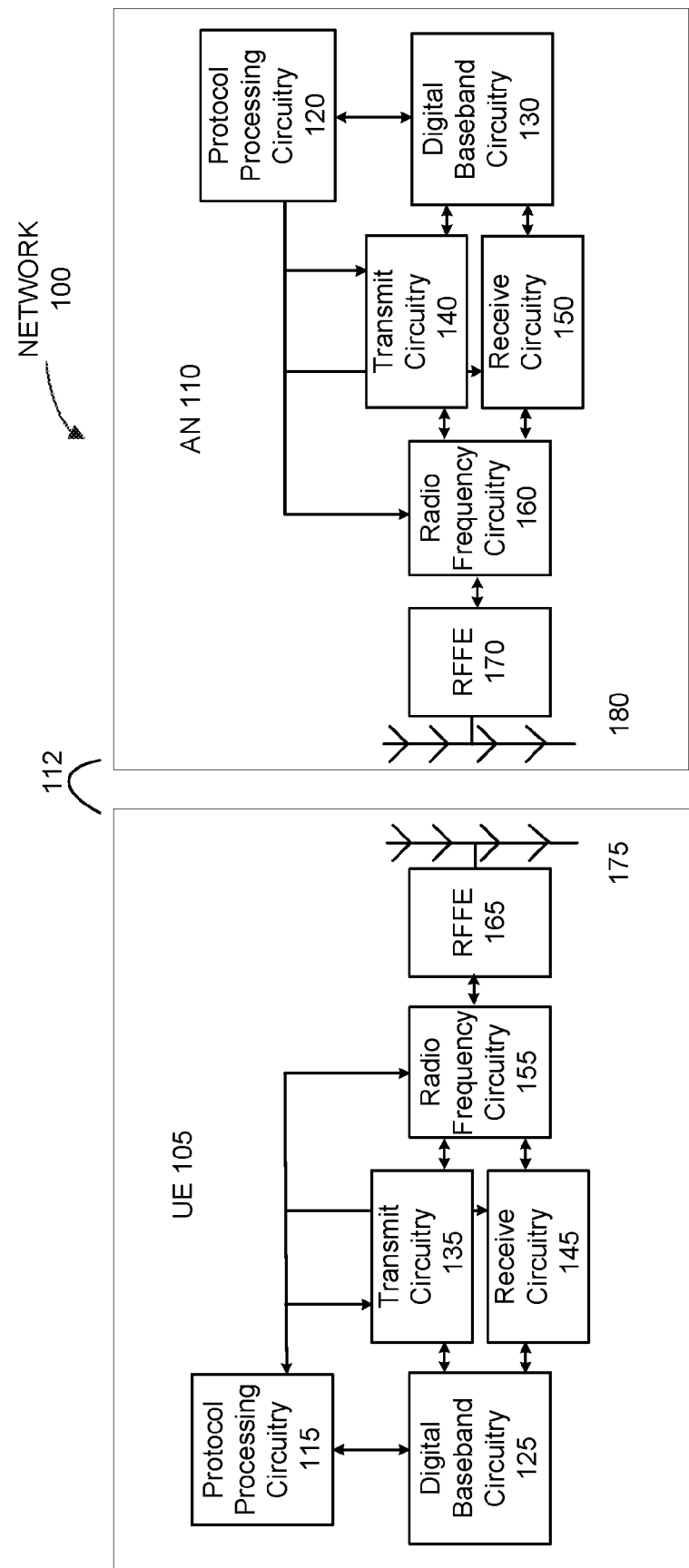
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

In NR, RLM and/or BFD may be performed by a UE based on a PDCCH hypothetical BLER estimation. An RLM/BFD reference signal (RS) may be one or more synchronization signal blocks (SSBs) and/or channel state information RSs (CSI-RSs). The estimated PDCCH hypothetical BLER may be averaged with more than one measurement for better accuracy and/or other purposes. A final estimated PDCCH hypothetical BLER may be compared with two or more threshold values to determine whether the UE may trigger an in-sync (IS) or out-of-sync (OOS) event. However, such an estimation may be based on a non-coherent approach in NR instead of a coherent approach in long term evolution (LTE) technologies, which is further discussed with respect to FIG. 1. In channels with different fading effects, this may cause inaccuracy in the BLER estimation and/or IS/OOS event triggering.

Embodiments described herein may include, for example, apparatuses, methods, and storage media for performing RLM/BFD in, or related to, an NR involved network from perspectives of both UE and network. Various embodiments are directed to adaptive configuration of threshold values for IS/OOS in the NR involved network and adequately performing RLM/BFD. Such RLM/BFD with adaptive IS/OOS configuration may improve measurement accuracy and system performance.

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
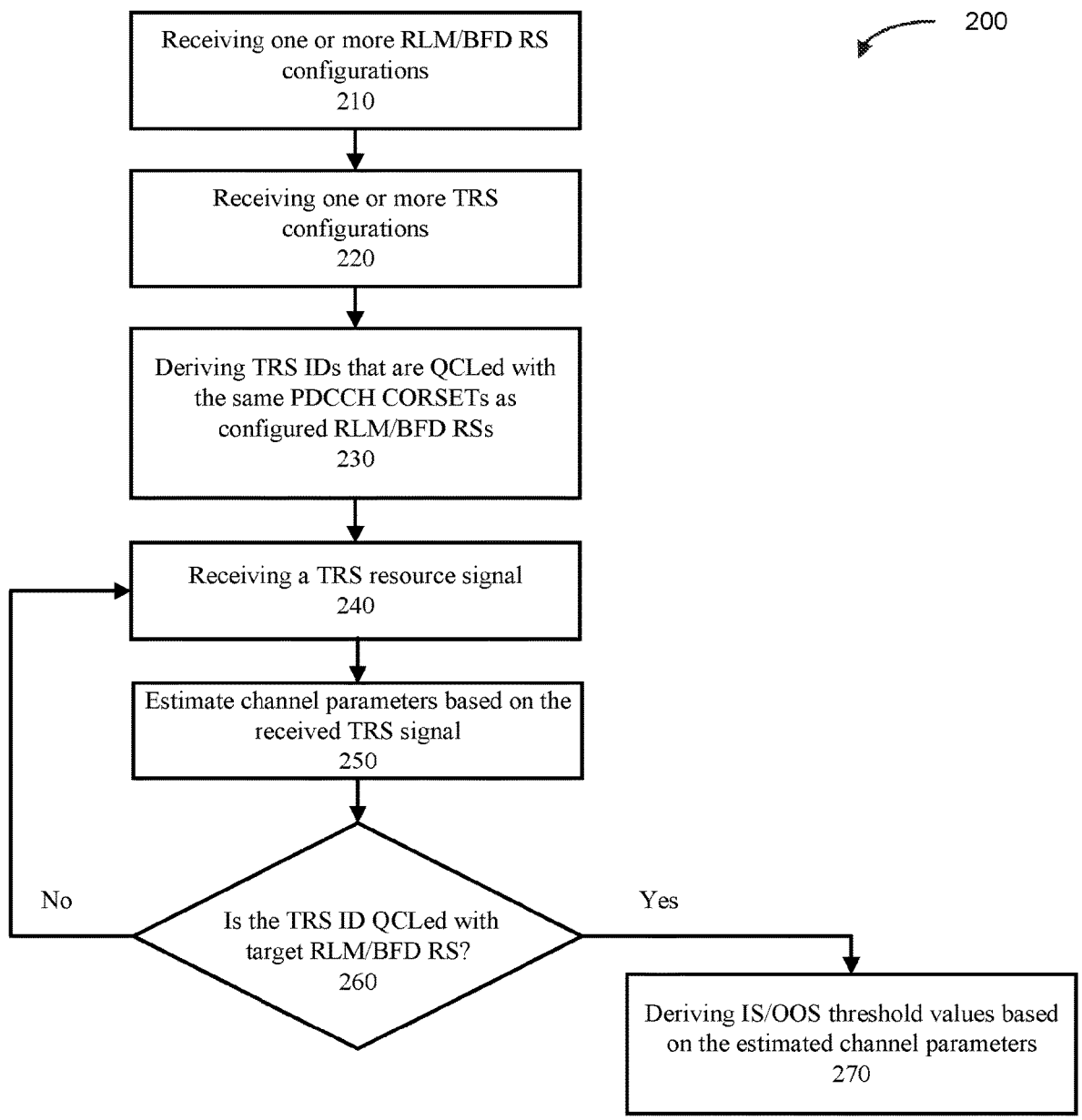
FIG. 2 illustrates an operation flow/algorithmic structure to facilitate a process of RLM/BFD with adaptive in-synchronization (IS)/out-of-synchronization (OOS) classification from a UE perspective, in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam.

In various embodiments, the UE 105 may perform RLM, in which the UE 105 may make measurements of signal quality on one or more cells. The UE 105 may perform the measurements on a reference signal, such as a synchronization signal (SS)/physical broadcast channel (PBCH) block (SSB). The measurements may include one or more of a reference signal received power (RSRP), a reference signal received quality (RSRQ), a signal to interference plus noise ratio (SINR), and/or another suitable measurement.

As part of RLM, the UE 105 may determine it is OOS with a cell if the signal quality is below an out-of-sync threshold Qout. The UE 105 may determine it is IS with the cell if the signal quality is greater than an in-sync threshold Qin. The threshold Qout may correspond to a level at which the downlink radio link cannot be reliably received (e.g., the physical downlink control channel (PDCCH) cannot be successfully received). The threshold Qin may correspond to a level at which the downlink radio link quality can be significantly more reliably received than at Qout. In some embodiments, the threshold Qout may correspond to a BLER of 10% and/or the threshold Qin may correspond to a BLER of 2%. The IS/OOS tests may validate the UE performance requirements with respect to RLM.

In LTE RLM, the PDCCH hypothetical BLER may be measured based on a cell specific reference signal (CRS), which may occupy four reference OFDM symbols per LTE subframe. The PDCCH hypothetical BLER in LTE is estimated in a coherent approach. In this approach, frequency domain sub-band channel estimations and frequency domain sub-band noise estimations may be performed by re-using CRS-based channel estimation filtering from downlink (DL) data demodulation process, since the DL data demodulation is performed based on a DL demodulation reference signal (DMRS). Sub-band may be referred to as a bandwidth associated with one or more resource blocks (RBs) for a particular channel. Then, an SINR for each sub-band may be calculated based on per RB level or some other levels. A combined SINR may be derived by averaging the calculated sub-band SINRs. Then, the derived combined SINR may be mapped into the PDCCH hypothetical BLER based on a pre-defined PDCCH performance table. In this approach, all of the corresponding estimations are based on the same CRS and the estimations are coherent. Then, a constant set of threshold values for IS/OOS may be derived for IS/OOS classification and be used in triggering IS/OOS events in RLM/BFD.

In contrast, an NR RLM may be performed in a non-coherent approach. There are several reasons for this difference. For example, a sub-band channel estimation may not reuse corresponding DL data demodulation process as the NR RLM/BFD may be performed based on reference signals (e.g., SSB and/or CSI-RS) other than DL DMRS. In addition, it may not be cost-effective for a UE modem to introduce dedicated channel estimation filter processing for RLM/BFD resources, because the number of processes that needs to be monitored in this regard may be significantly increased in NR RLM than in LTE RLM. For example, NR RLM may be required to monitor up to eight RLM/BFD processes per component carrier (CC) in contrast to only one RLM/BFD process per CC in LTE.

Further, a sub-band noise estimation may not be filtered across DL slots with a time-based filter, due to the reference signals used in the NR RLM. It is noted that the sub-band noise estimation needs to be smoothed by one or more time-based filters to derive stable effective SINR(s). In the LTE RLM, an infinite impulse response (IIR) filter may be applied in filtering multiple DL transmission time intervals (TTIs). But the NR RLM may not be able to apply such a filter because the reference signals are not allocated in one DL slot. Instead, the RLM RSs may be allocated in up to 20 slots.

Therefore, the PDCCH hypothetical BLER estimation in the NR RLM/BFD may be based on a non-coherent approach. In this approach, the UE 105 may estimate a wideband (WB) reference signal power level, such as RSRP, RSRQ, and/or SINR with respect to SSB and/or CSI-RS. The UE 105 may further estimate a noise power level over the same WB. This estimation, for example, may be performed by subtracting a total received power by the estimated reference signal power. In accordance, a WB SINR may be derived and mapped into the PDCCH hypothetical BLER based on the pre-defined PDCCH performance table. This non-coherent approach may not include considerations of channel fading effects, which may be frequency-dependent, e.g., a frequency selective fading effect. It may not be accurate any more to use constant hypothetical BLER threshold values in the NR RLM/BFD and/or configuring the IS/OOS classification in the NR RLM/BFD accordingly, when the UE 105 modem may experience different PDCCH performances in different fading channels. The non-coherent approach may lead to a lack of channel information for optimization of IS/OOS classification.

In embodiments, IS/OOS classification in adapting IS/OOS threshold values may be performed based on channel parameter estimations. In this regard, the channel parameter estimation may re-use DL tracking reference signals (TRSs) in a TRS processing, when the TRS is quasi co-located (QCLed) with the same PDCCH control resource set (CORESET) as a target RLM/BFD RS. Two reference signals may be QCLed if they are received by two antenna ports that are quasi co-located, where properties of a channel over which a symbol on one antenna port is conveyed can be inferred from the channel over which a symbol on the other antenna port is conveyed. There may be different QCL types, such as QCL types A, B, C, and D. Each QCL type may correspond to different correlation between symbols from different antenna ports. For example, QCL type A may correspond to Doppler shift, Doppler spread, average delay, and delay spread. QCL type B may correspond to Doppler shift and Doppler spread. QCL type C may correspond to Doppler shift and average delay. QCL type A may correspond to spatial receiver parameters.

FIG. 2 illustrates an example operation flow/algorithmic structure 200 to facilitate RLM/BFD with adaptive IS/OOS classification from a UE perspective, in accordance with various embodiments. The operation flow/test structure 200 may be performed by the UE 105 or circuitry thereof.

The operation flow/test structure 200 may include, at 210, receiving one or more RLM/BFD RS configurations. The configurations may be received via RRC signaling. The configurations may identify or indicate one or more RSs for monitoring one or more radio links and/or detecting one or more beam failures.

The operation flow/test structure 200 may include, at 220, receiving one or more TRS configurations. The configurations may be received via RRC signaling. The TRS configurations may identify or indicate one or more TRSs.

The operation flow/test structure 200 may include, at 230, deriving one or more TRS identifications (IDs) that are QCLed with the same PDCCH CORSETs as configured RLM/BFD RSs. Such a derivation may be based on the TRS configurations and/or RLM/BFD RS configurations.

The operation flow/test structure 200 may include, at 240, receiving a TRS resource signal. The TRS resource may be received via a TRS signal that is indicated by the one or more TRS configurations.

The operation flow/test structure 200 may include, at 250, estimating one or more channel parameters based on the received TRS resource signal. The TRS resource may be received via a TRS signal that indicated by the one or more TRS configurations. The channel parameter estimation may be the same or substantially similar to various typical channel parameter estimations in wireless communications. Such estimations may include, but are not limited to, a delay spread estimation, a timing offset error estimation, and a Doppler spread estimation.

The operation flow/test structure 200 may include, at 260, determining whether the derived TRS ID is QCLed with an ID from a PDCCH CORSET in a target RLM/BFD RS. The target RLM/BFD RS may be indicated by the one or more RLM/BFD configurations. The TRS and the target RLM/BFD RS may be directly or indirectly QCLed. In one example, if the TRS and the target RLM/BFD RS are respectively QCLed with the same PDCCH CORSET, they may be also QCLed. The TRS and the target RLM/BFD RS may have the same or different QCL types. For example, A TRS may be QCLed with a PDCCH CORSET in Type A, while a target RLM/BFD RS may be QCLed with the same PDCCH CORSET in Type D. Such a TRS and a target RLM/BFD RS may be considered to be QCLed.

In embodiments, the TRS and target RLM/BFD RS may be QCLed indirectly via one or more hops. For example, a TRS resource is QCLed with a CSI-RS resource, and the SCI-RS resource is QCLed with a PDCCH CORSET. Meanwhile, a target RLM/BFD RS resource is QCLed with the same CSI-RS resource. Thus, the TRS resource and the target RLM/BFD RS resource may be considered to be QCLed as well.

The operation flow/test structure 200 may include, at 270, deriving IS/OOS threshold values in IS/OOS classification based on the estimated channel parameters from the TRS, if the TRS and the target RLM/BFD RS are QCLed. The derivation of the IS/OOS threshold values based on channel parameter estimation may be the same or substantially similar to various typical IS/OOS threshold value derivation in cellular wireless communications or like wireless communications. Alternatively, the UE 105 may extract the IS/OOS threshold values if the values that are associated with the target RLM/BFD RS are derived earlier and/or stored for the UE 105. In accordance, the IS/OOS threshold values may be updated for the target RLM/BFD RS. Once the UE 105 receives the target RLM/BFD RS, the UE 105 may perform RLM/BFD by using the target RLM/BFD RS with respect to the updated IS/OOS classification.

In embodiments, if the received TRS and the target RLM/BFD RS are not QCLed, the UE 105 may not derive IS/OOS classification, but wait to receive another TRS and repeat operations 240-260.

In some embodiments, the channel parameter estimation may be performed with respect to the same target RLM/BFD RS resources. In this alternative or additional approach, corresponding CSI-RS and/or SSB resources may be used for the channel parameter estimation.

In some embodiments, the channel parameter estimation may be performed with respect to one or more different resources rather than the same target RLM/BFD RS, if the different resources are QCLed with the target RLM/BFD RS. In this approach, CSI-RS, SSB, and/or PDCCH DMRS resources may be used for the channel parameter estimation.

In embodiments, the IS/OOS threshold values may be defined with respect to BLER, where the IS/OOS threshold values are directed to target IS/OOS PDCCH BLER thresholds. For example, a PDCCH BLER value for IS threshold may be 2% and a PDCCH BLER value for OOS threshold may be 10%. Then, corresponding IS/OOS threshold adaption may be performed based on a look-up table (LUT), in which a plurality of quantized channel parameters are to be correlated to respective delta BLER values. The delta BLER values may indicate respective offsets in determining the IS/OOS threshold values defined with respect to BLER values.

In embodiments, the IS/OOS threshold values may be defined with respect to SINR values, where the SINR values are mapped with target IS/OOS PDCCH BLER thresholds. For example, a PDCCH BLER value for IS threshold may be 2% and mapped with a corresponding SINR value. Thus, the IS/OOS threshold adaption may be performed based on an LUT, in which a plurality of quantized channel parameters are to be correlated to respective delta SINR values that are correlated with the target IS/OOS PDCCH BLER thresholds. The delta SINR values may indicate respective offsets in determining the IS/OOS threshold values defined with respect to SINR values.

Figure 3:
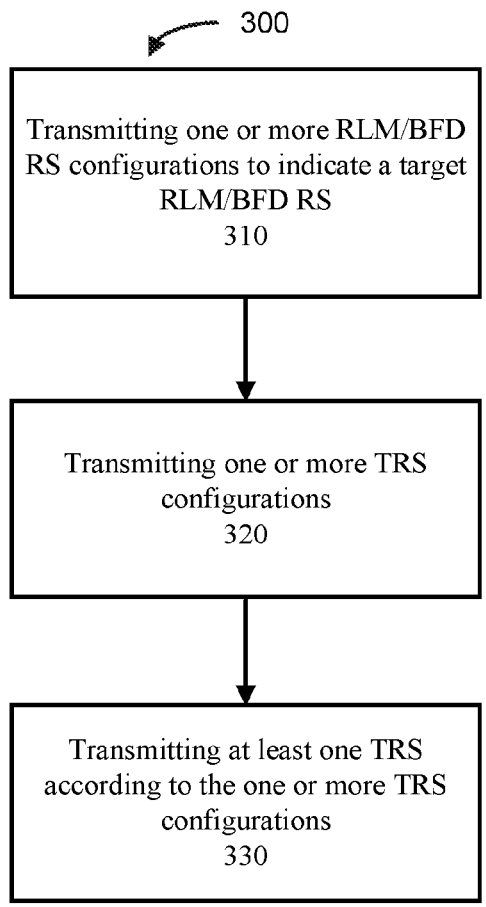
FIG. 3 illustrates an operation flow/algorithmic structure to facilitate the process of the RLM/BFD with adaptive IS/OOS classification from an AN perspective, in accordance with some embodiments.

FIG. 3 illustrates the example operation flow/algorithmic structure 300 to facilitate the RLM/BFD with adaptive IS/OOS classification from an AN perspective, in accordance with various embodiments. The operation flow/test structure 300 may be performed by the AN 110 or circuitry thereof.

The operation flow/test structure 300 may include, at 310, transmitting one or more RLM/BFD RS configurations to indicate a target RLM/BFD RS. The target RLM/BFD RS may be generated for monitoring a radio link or detecting a beam failure. The target RLM/BFD RS may include, but is not limited to, at least one of the following RS: TRS, SSB, CSI-RS, and PDCCH DMRS. One or more of those RSs may be used for channel parameter estimations.

The operation flow/test structure 300 may include, at 320, transmitting one or more TRS configurations. The TRS configurations may indicate one or more TRS that may be transmitted to the UE. The one or more TRS may be or may not be for monitoring a radio link or detecting a beam failure.

The operation flow/test structure 300 may include, at 330, transmitting at least one TRS according to the one or more TRS configurations. The at least one may be or may not be for monitoring a radio link or detecting a beam failure. In embodiments, the at least one TRS may be QCLed with the target RLM/BFD RS. Such a TRS may be used for channel parameter estimation, and the estimated channel parameters may be used for deriving the threshold values for IS/OOS classification with respect to RLM/BFD.

In embodiments, the AN may transmit an additional RS, which may be used for parameter estimations and subsequent derivation of the threshold values for the IS/OOS classification. In this case, the additional RS may include, but is not limited to, at least one of the following RS: TRS, SSB, CSI-RS, and PDCCH DMRS. The RS blocks that are used for the channel parameter estimations may be QCLed with the target RLM/BFD RS. The association of the QCL may be directly or indirectly associated. Further details with respect to such associations are discussed with respect to FIG. 2.

Figure 4:
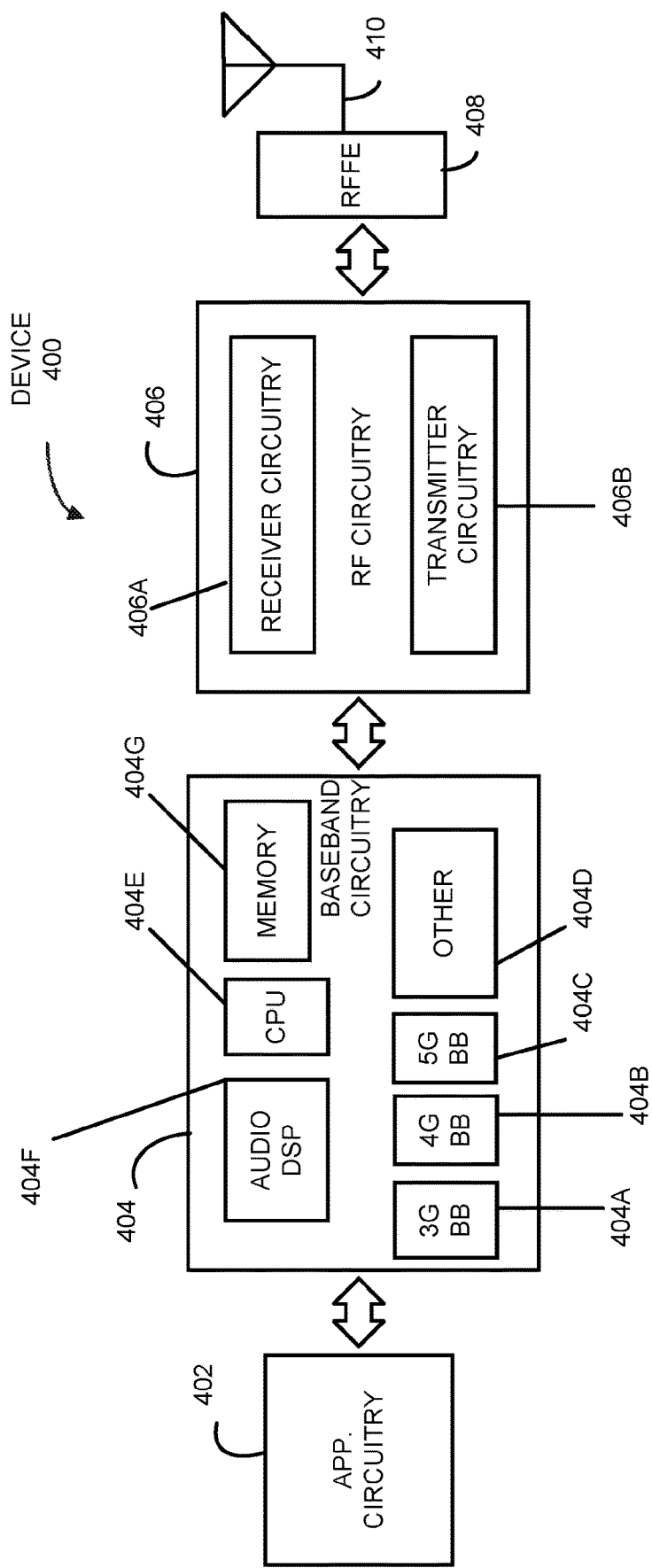
FIG. 4 illustrates example components of a device in accordance with various embodiments.

FIG. 4 illustrates example components of a device 400 in accordance with some embodiments. In contrast to FIG. 1, FIG. 4 illustrates example components of the UE 105 or the AN 110 from a receiving and/or transmitting function point of view, and it may not include all of the components described in FIG. 1. In some embodiments, the device 400 may include application circuitry 402, baseband circuitry 404, RF circuitry 406, RFFE circuitry 408, and a plurality of antennas 410 together at least as shown. The baseband circuitry 404 may be similar to and substantially interchangeable with the baseband circuitry 125 in some embodiments. The plurality of antennas 410 may constitute one or more antenna panels for beamforming. The components of the illustrated device 400 may be included in a UE or an AN. In some embodiments, the device 400 may include fewer elements (for example, a cell may not utilize the application circuitry 402, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may be similar to and substantially interchangeable with the baseband circuitry 125 and the baseband circuitry 130 in some embodiments. The baseband circuitry 404 may include one or more baseband processors or control logic to process baseband signals received from a receive signal path of the RF circuitry 406 and to generate baseband signals for a transmit signal path of the RF circuitry 406. Baseband circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (for example, second generation (2G), sixth generation (6G), etc.). The baseband circuitry 404 (for example, one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a central processing unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 404 and the application circuitry 402 may be implemented together such as, for example, on a SOC.

In some embodiments, the baseband circuitry 404 may provide for communication compatible with one or more radio technologies. For example, in some embodiments, the baseband circuitry 404 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include one or more switches, filters, amplifiers, etc. to facilitate the communication with the wireless network. RF circuitry 406 may include receiver circuitry 406A, which may include circuitry to down-convert RF signals received from the RFFE circuitry 408 and provide baseband signals to the baseband circuitry 404. RF circuitry 406 may also include transmitter circuitry 406B, which may include circuitry to up-convert baseband signals provided by the baseband circuitry 404 and provide RF output signals to the RFFE circuitry 408 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio integrated circuit (IC) circuitry may be provided for processing signals for each spectrum, although the scope of the embodiments is not limited in this respect.

RFFE circuitry 408 may include a receive signal path, which may include circuitry configured to operate on RF beams received from one or more antennas 410. The RF beams may be transmit beams formed and transmitted by the AN 110 while operating in mmWave or sub-mmWave frequency rang. The RFFE circuitry 408 coupled with the one or more antennas 410 may receive the transmit beams and proceed them to the RF circuitry 406 for further processing. RFFE circuitry 408 may also include a transmit signal path, which may include circuitry configured to amplify signals for transmission provided by the RF circuitry 406 for transmission by one or more of the antennas 410, with or without beamforming. In various embodiments, the amplification through transmit or receive signal paths may be done solely in the RF circuitry 406, solely in the RFFE circuitry 408, or in both the RF circuitry 406 and the RFFE circuitry 408.

In some embodiments, the RFFE circuitry 408 may include a TX/RX switch to switch between transmit mode and receive mode operation. The RFFE circuitry 408 may include a receive signal path and a transmit signal path. The receive signal path of the RFFE circuitry 408 may include a low noise amplifier (LNA) to amplify received RF beams and provide the amplified received RF signals as an output (for example, to the RF circuitry 406). The transmit signal path of the RFFE circuitry 408 may include a power amplifier (PA) to amplify input RF signals (for example, provided by RF circuitry 406), and one or more filters to generate RF signals for beamforming and subsequent transmission (for example, by one or more of the one or more antennas 410).

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

FIG. 5A illustrates an embodiment of a radio frequency front end 500 incorporating an mmWave RFFE 505 and one or more sub-6 GHz radio frequency integrated circuits (RFICs) 510. The mmWave RFFE 505 may be similar to and substantially interchangeable with the RFFE 165, RFFE 170, and/or the RFFE circuitry 408 in some embodiments. The mmWave RFFE 505 may be used for the UE 105 while operating in FR2 or mmWave; the RFICs 510 may be used for the UE 105 while operating in FR1, sub-6 GHz, or LTE bands. In this embodiment, the one or more RFICs 510 may be physically separated from the mmWave RFFE 505.

RFICs 510 may include connection to one or more antennas 520. The RFFE 505 may be coupled with multiple antennas 515, which may constitute one or more antenna panels.

FIG. 5B illustrates an alternate embodiment of an RFFE 525. In this aspect both millimeter wave and sub-6 GHz radio functions may be implemented in the same physical RFFE 530. The RFFE 530 may incorporate both millimeter wave antennas 535 and sub-6 GHz antennas 540. The RFFE 530 may be similar to and substantially interchangeable with the RFFE 165, RFFE 170, and/or the RFFE circuitry 408 in some embodiments.

FIGS. 5A and 5B illustrate embodiments of various RFFE architectures for either the UE 105 or the AN 110.

Figure 6:
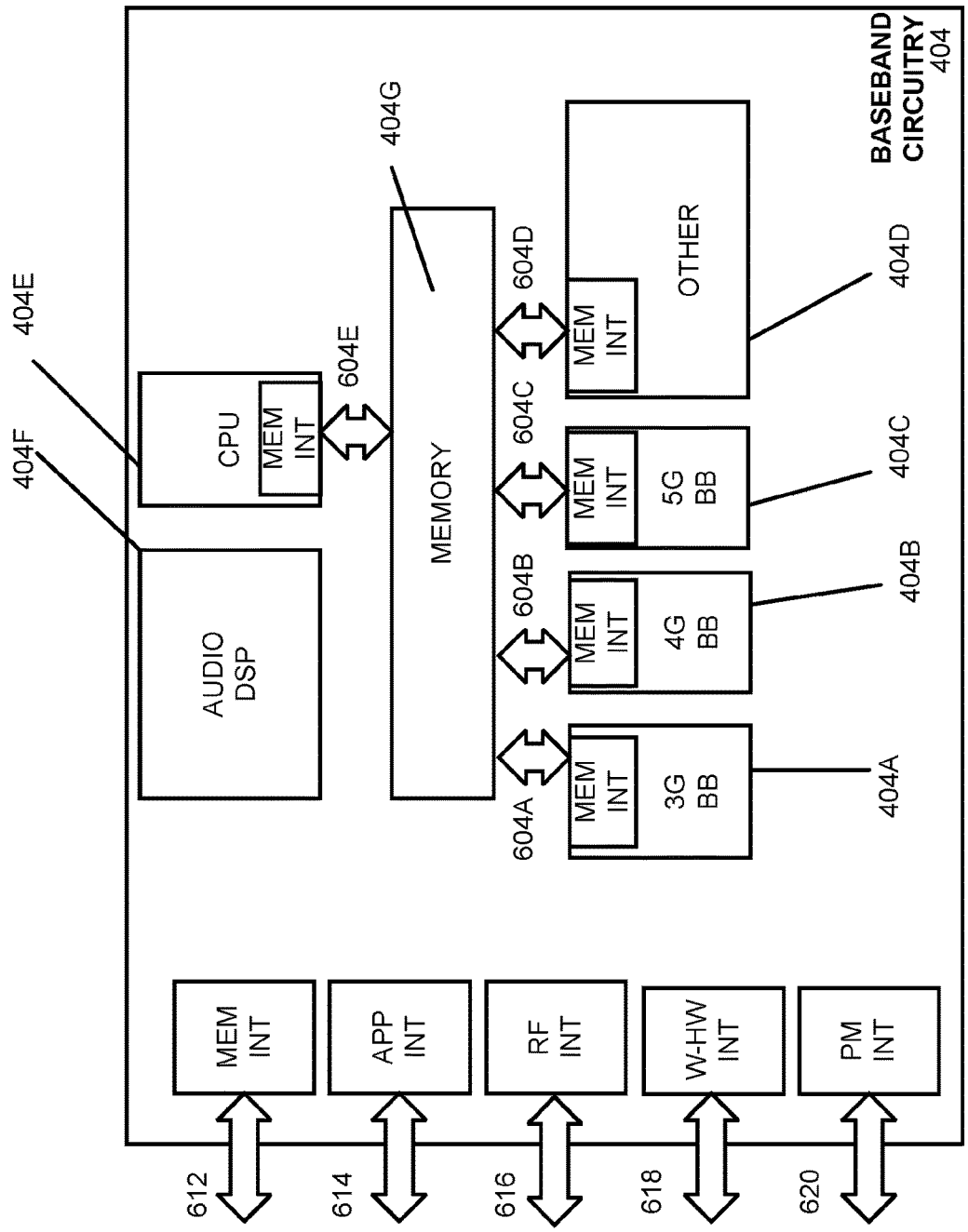
FIG. 6 illustrates example interfaces of baseband circuitry in accordance with various embodiments.

FIG. 6 illustrates example interfaces of baseband circuitry in accordance with some embodiments. As discussed above, the baseband circuitry 404 of FIG. 2 may comprise processors 404A-404E and a memory 404G utilized by said processors. The processors 404A-404E of the UE 105 may perform some or all of the operation flow/algorithmic structure 200, in accordance with various embodiments. The processors 404A-404E of the AN 110 may perform some or all of the operation flow/algorithmic structure 300, in accordance with various embodiments. Each of the processors 404A-404E may include a memory interface, 604A-604E, respectively, to send/receive data to/from the memory 404G. The processors 404A-404E of the UE 105 may be used to process the SFTD measurement; the processors 404A-404E of the AN 110 may be used to generate the SFTD measurement configuration.

The baseband circuitry 404 may further include one or more interfaces to communicatively couple to other circuitries/devices, such as a memory interface 612 (e.g., an interface to send/receive data to/from memory external to the baseband circuitry 404), an application circuitry interface 614 (for example, an interface to send/receive data to/from the application circuitry 402 of FIG. 2), an RF circuitry interface 616 (for example, an interface to send/receive data to/from RF circuitry 406 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
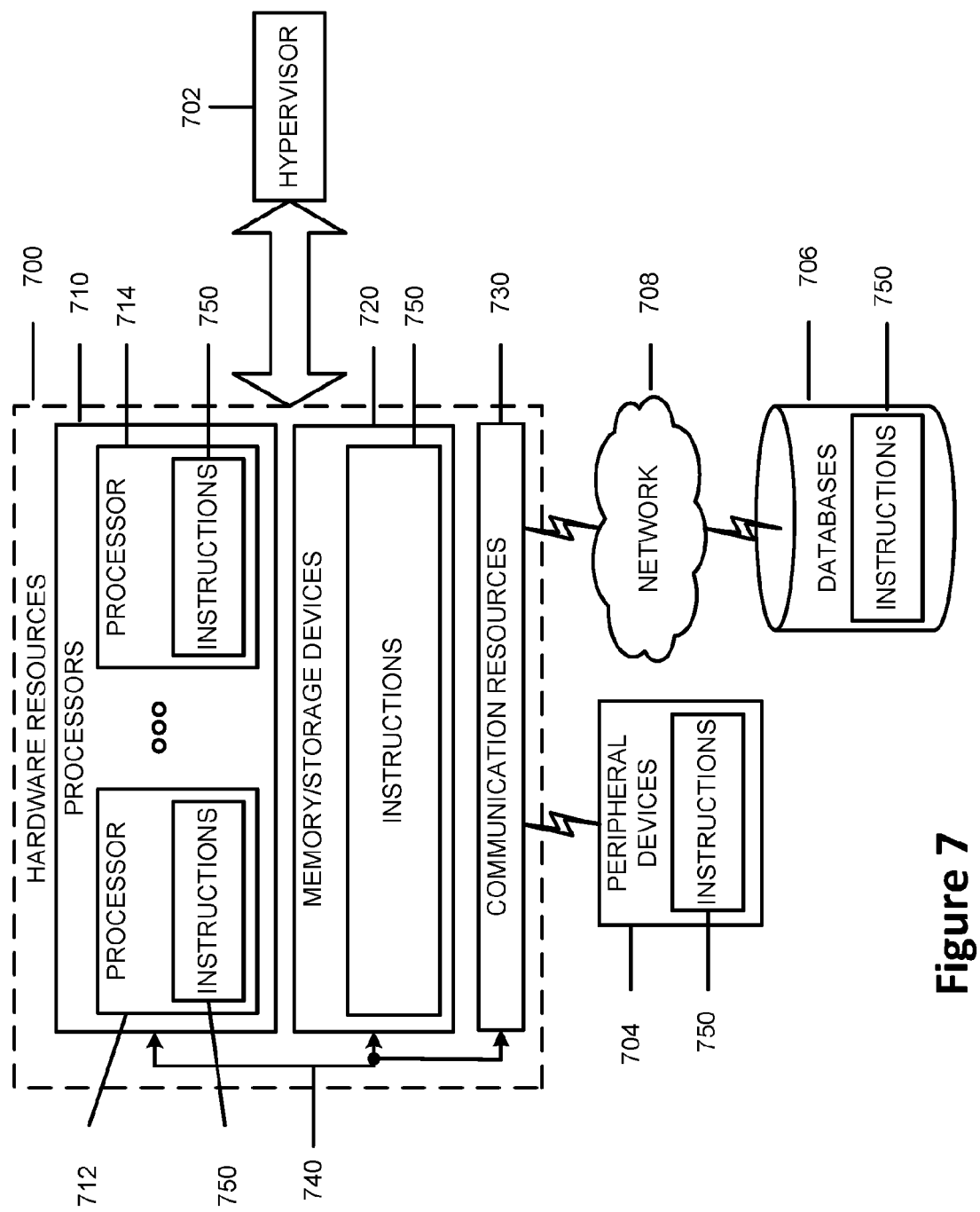
FIG. 7 illustrates hardware resources in accordance with various embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein, e.g., the operation flows 200 and 300. For example, in an embodiment in which the hardware resources 700 are implemented into the UE 105, the instructions 750 may cause the UE to perform some or all of the operation flow/algorithmic structure 200. In other embodiments, the hardware resources 700 may be implemented into the AN 110. The instructions 750 may cause the AN 110 to perform some or all of the operation flow/algorithmic structure 300. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include a method comprising: decoding, upon reception of one or more radio link monitoring or beam failure detection (RLM/BFD) reference signal (RS) configurations, information that indicates a target RLM/BFD RS for monitoring radio link or detecting beam failure; decoding, upon reception of one or more radio tracking reference signal (TRS) configurations, information that indicates one or more TRS; receiving a TRS based on the decoded one or more TRS configurations; determining whether the target RLM/BFD RS and the received TRS are quasi co-located (QCLed); deriving a set of threshold values for an in-sync (IS)/out-of-sync (OOS) classification based on a set of channel parameters that are estimated based on the received TRS of a received RS, if the target RLM/BFD RS and the received TRS are QCLed; and updating the set of threshold values for the IS/OOS classification with respect to the target RLM/BFD RS.

Example 2 may include the method of example 1 and/or some other examples herein, wherein if the target RLM/BFD RS and the received TRS are not QCLed, the received TRS is a first received TRS, and the method is further to comprise: receiving a second TRS based on the decoded one or more TRS configurations; and determining that the target RLM/BFD RS and the second received TRS are QCLed.

Example 3 may include the method of example 1 and/or some other examples herein, wherein to determine target RLM/BFD RS and the received TRS are QCLed is to determine the target RLM/BFD RS and the TRS correspond to a same physical downlink control channel (PDCCH) control resource set (CORESET).

Example 4 may include the method of example 1 and/or some other examples herein, wherein the set of threshold values for the IS/OOS classification correspond to respective block error rate (BLER) values with respect to physical downlink control channel (PDCCH) BLER measurements, and the set of threshold values includes one or more threshold values for IS threshold and one or more threshold values for OOS threshold.

Example 5 may include the method of example 4 and/or some other examples herein, wherein the set of threshold values for the IS/OOS classification correspond to respective signal to noise and interference (SINR) values that are associated with the respective BLER values.

Example 6 may include the method of example 1 and/or some other examples herein, wherein to derive the set of threshold values for the IS/OOS classification, the method is to comprise: deriving, based on the estimated channel parameters that correspond to the received TRS, a set of offset values from a set of pre-defined threshold values according to a look-up table (LUT) with respect to the set of channel parameters; and derive the set of threshold values by updating the pre-defined threshold values with the set of offset values.

Example 7 may include the method of example 6 and/or some other examples herein, wherein the LUT includes a plurality of mappings between the set of channel parameters and the set of offset values from a set of pre-determined IS/OOS threshold values.

Example 8 may include the method of example 7 and/or some other examples herein, wherein the set of offset values and the set of pre-determined IS/OOS threshold values are defined or measured in BLER or SINR.

Example 9 may include the method of example 6 and/or some other examples herein, further comprising estimating the set of channel parameters, based on one or more estimations of a delay spread estimation, a timing offset error estimation, and a Doppler spread estimation.

Example 10 may include the method of any of examples 1-9 and/or some other examples herein, further comprising: receiving the target RLM/BFD RS based on the decoded one or more RLM/BFD RS configurations; measuring the target RLM/BFD RS for monitoring radio link or detecting beam failure; comparing at least one measurement result of the target RLM/BFD RS with the set of threshold values; and triggering an IS or OOS event based on the comparison of the at least one measurement result of the target RLM/BFD RS with the set of threshold values.

Example 11 may include the method of any of example 10 and/or some other examples herein, wherein to measure the target RLM/BFD RS for monitoring radio link or detecting beam failure, instructions are to measure at least one of a target synchronization signal block (SSB) or a target channel status information-reference signal (CSI-RS) of the target RLM/BFD RS.

Example 12 may include the method of example 10 and/or some other examples herein, wherein the target RLM/BFD RS includes at least one of a synchronization signal block (SSB), a channel status information-reference signal (CSI-RS), and a physical downlink control channel (PDCCH) demodulation reference signal (DMRS).

Example 13 may include the method of example 12 and/or some other examples herein, further comprising estimating the set of channel parameters based on the at least one of the SSB, the CSI-RS, and the PDCCH DMRS.

Example 14 may include the method of example 1 and/or some other examples herein, wherein the received RS is a first received RS, and the method is further to comprise receiving a second RS that includes at least one of a synchronization signal block (SSB), a channel status information-reference signal (CSI-RS), and a physical downlink control channel (PDCCH) demodulation reference signal (DMRS); and estimating the set of channel parameters based on the at least one of the SSB, the CSI-RS, and the PDCCH DMRS.

Example 15 may include a method, comprising: receiving a radio link monitoring (RLM) or beam failure detection (BFD) reference signal (RS) configuration that indicates a RLM/BFD RS for monitoring radio link or detecting beam failure; measuring, upon reception of a target RLM/BFD RS, the RLM/BFD RS for monitoring radio link or detecting beam failure; comparing at least one measurement result of the target RLM/BFD RS with a set of threshold values for an in-sync (IS)/out-of-sync (OOS) classification, and triggering an IS or OOS event based on the comparison of the at least one measurement result of the target RLM/BFD RS with the set of threshold values.

Example 16 may include the method of example 15 and/or some other examples herein, further comprising estimating a set of channel parameters based on the target RLM/BFD RS; and deriving the set of threshold values for the IS/OOS classification based on the set of channel parameters.

Example 17 may include the method of any of examples 15-16 and/or some other examples herein, wherein the target RLM/BFD RS is a first RS, and the interface circuitry is further to receive a second RS that includes at least one of a tracking RS (TRS), a synchronization signal block (SSB), a channel status information-RS (CSI-RS), and a physical downlink control channel (PDCCH) demodulation RS (DMRS).

Example 18 may include the method of any of example 17 and/or some other examples herein, further comprising determining that the second RS and the target RLM/BFD RS are QCLed; estimating a set of channel parameters based on the second RS; and deriving the set of threshold values for the IS/OOS classification based on the set of channel parameters.

Example 19 may include the method of any of examples 15-18 and/or some other examples herein, further comprising receiving one or more tracking RS (TRS) configurations, and receiving at least one TRS based on the one or more TRS configurations.

Example 20 may include the method of example 19 and/or some other examples herein, further comprising determining that the at least one TRS and the target RLM/BFD RS are QCLed; estimating a set of channel parameters based on the at least one TRS; and deriving the set of threshold values for the IS/OOS classification based on the set of channel parameters.

Example 21 may include the method of examples 1-20 and/or some other examples herein, wherein the method is to be performed by a UE or a portion thereof.

Example 22 may include a method comprising generating one or more radio link monitoring (RLM) or beam failure detection (BFD) reference signal (RS) configurations to indicate a target RLM/BFD RS for monitoring radio link or detecting beam failure; and transmitting, to a user equipment (UE), the one or more RLM/BFD RS configurations to indicate a target RLM/BFD RS for monitoring radio link or detecting beam failure.

Example 23 may include the method of example 22 and/or some other examples herein, further comprising transmitting the target RLM/BFD RS to the UE, according to the one or more RLM/BFD RS configurations.

Example 24 may include the method of any of examples 22-23 and/or some other examples herein, further comprising transmitting one or more tracking reference signal (TRS) configurations to the UE; and transmitting at least one TRS to the UE that is quasi co-located (QCLed) with the target RLM/BFD RS.

Example 25 may include the method of any of examples 22-23 and/or some other examples herein, wherein to transmit the one or more RLM/BFD RS configurations and the one or more TRS configurations is to transmit via radio resource control (RRC) signaling.

Example 26 may include the method of any of examples 12-25 and/or some other example herein, wherein the method is performed by an access node (AN) or a portion thereof.

Example 27 may include an apparatus comprising means to perform one or more elements of the method described in or related to any of examples 1-26, or any other method or process described herein.

Example 28 may include one or more non-transitory computer-readable media comprising instructions to cause an electronic device, upon execution of the instructions by one or more processors of the electronic device, to perform one or more elements of the method described in or related to any of examples 1-26, or any other method or process described herein.

Example 29 may include an apparatus comprising logic, modules, and/or circuitry to perform one or more elements of the method described in or related to any of examples 1-26, or any other method or process described herein.

Example 30 may include a method, technique, or process as described in or related to any of examples 1-26, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of examples 1-26, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) comprising instructions to, upon execution of the instructions by one or more processors of a user equipment (UE), cause the UE to perform operations, the operations comprising:
    decoding, upon reception of one or more radio link monitoring or beam failure detection (RLM/BFD) reference signal (RS) configurations, information that indicates a target RLM/BFD RS for monitoring radio link or detecting beam failure;
    decoding, upon reception of one or more radio tracking reference signal (TRS) configurations, information that indicates one or more TRS;
    receiving a TRS based on the decoded one or more TRS configurations;
    determining whether the target RLM/BFD RS and the received TRS are quasi co-located (QCLed);
    deriving a set of threshold values for an in-sync (IS)/out-of-sync (OOS) classification based on a set of channel parameters that are estimated based on the received TRS of a received RS, responsive to the target RLM/BFD RS and the received TRS are QCLed; and
    updating the set of threshold values for the IS/OOS classification with respect to the target RLM/BFD RS.

2. The non-transitory CRM of claim 1, responsive to the target RLM/BFD RS and the received TRS are not QCLed, the received TRS is a first receive TRS, the operations further comprising:
    receiving a second TRS based on the decoded one or more TRS configurations; and
    determine that the target RLM/BFD RS and the second received TRS are QCLed.

3. The non-transitory CRM of claim 1, wherein the determining whether the target RLM/BFD RS and the received TRS are QCLed further comprises determining that the target RLM/BFD RS and the received TRS correspond to a same physical downlink control channel (PDCCH) control resource set (CORESET).

4. The non-transitory CRM of claim 1, wherein the set of threshold values for the IS/OOS classification correspond to respective block error rate (BLER) values with respect to physical downlink control channel (PDCCH) BLER measurements.

5. The non-transitory CRM of claim 4, wherein the set of threshold values for the IS/OOS classification correspond to respective signal to interference plus noise ratio (SINR) values that are associated with the respective BLER values.

6. The non-transitory CRM of claim 1, wherein the deriving the set of threshold values for the IS/OOS classification further comprises:
 deriving, based on the estimated channel parameters that correspond to the received TRS, a set of offset values from a set of pre-defined threshold values according to a look-up table (LUT) with respect to the set of channel parameters; and
 deriving the set of threshold values by updating the pre-defined threshold values with the set of offset values.

7. The non-transitory CRM of claim 6, wherein the operations further comprise estimating the set of channel parameters, based on one or more estimations of a delay spread estimation, a timing offset error estimation, and a Doppler spread estimation.

8. The non-transitory CRM of claim 1, wherein the operations further comprise:
 receiving the target RLM/BFD RS based on the decoded one or more RLM/BFD RS configurations;
 measuring the target RLM/BFD RS for monitoring radio link or detecting beam failure;
 comparing at least one measurement result of the target RLM/BFD RS with the set of threshold values and
 triggering an IS or OOS event based on the comparison of the at least one measurement result of the target RLM/BFD RS with the set of threshold values.

9. The non-transitory CRM of claim 8, wherein the measuring the target RLM/BFD RS for monitoring radio link or detecting beam failure further comprises measuring at least one of a target synchronization signal block (SSB) or a target channel status information-reference signal (CSI-RS) of the target RLM/BFD RS.

10. The non-transitory CRM of claim 8, wherein the target RLM/BFD RS includes at least one of a synchronization signal block (SSB), a channel status information-reference signal (CSI-RS), and a physical downlink control channel (PDCCH) demodulation reference signal (DMRS), and, upon execution, the instructions are further to cause the UE to estimate the set of channel parameters based on the at least one of the SSB, the CSI-RS, and the PDCCH DMRS.

11. The non-transitory CRM of claim 1, wherein the received RS is a first received RS, and, wherein the operations further comprise:
 receiving a second RS that includes at least one of a synchronization signal block (SSB), a channel status information-reference signal (CSI-RS), and a physical downlink control channel (PDCCH) demodulation reference signal (DMRS); and
 estimating the set of channel parameters based on the at least one of the SSB, the CSI-RS, and the PDCCH DMRS.

12. A user equipment (UE), comprising:
 interface circuitry configured to:
  receive a radio link monitoring (RLM) or beam failure detection (BFD) reference signal (RS) configuration that indicates a RLM/BFD RS for monitoring radio link or detecting beam failure,
  measure, upon reception of a target RLM/BFD RS, the RLM/BFD RS for monitoring radio link or detecting beam failure; and
 processing circuitry coupled with the interface circuitry, the processing circuitry configured to:
  compare at least one measurement result of the target RLM/BFD RS with a set of threshold values for an in-sync (IS)/out-of-sync (OOS) classification, and
  trigger an IS or OOS event based on the comparison of the at least one measurement result of the target RLM/BFD RS with the set of threshold values.

13. The UE of claim 12, wherein the processing circuitry is further configured to:
 estimate a set of channel parameters based on the target RLM/BFD RS; and
 derive the set of threshold values for the IS/OOS classification based on the set of channel parameters.

14. The UE of claim 12,
 wherein the target RLM/BFD RS is a first RS,
 wherein the interface circuitry is further configured to receive a second RS that includes at least one of a tracking RS (TRS), a synchronization signal block (SSB), a channel status information-RS (CSI-RS), and a physical downlink control channel (PDCCH) demodulation RS (DMRS), and
 wherein the processing circuitry is further configured to:
  determine that the second RS and the target RLM/BFD RS are QCLed; estimate a set of channel parameters based on the second RS; and
  derive the set of threshold values for the IS/OOS classification based on the set of channel parameters.

15. The UE of claim 12,
 wherein the interface circuitry is further configured to:
  receive one or more tracking RS (TRS) configurations, and
  receive at least one TRS based on the one or more TRS configurations; and
 wherein the processing circuitry is further configured to:
  determine that the at least one TRS and the target RLM/BFD RS are QCLed, estimate a set of channel parameters based on the at least one TRS, and
  derive the set of threshold values for the IS/OOS classification based on the set of channel parameters.

16. The UE of claim 12, wherein the set of threshold values for the IS/OOS classification is based on block error rate (BLER) or signal to interference plus noise ratio (SINR) measurement.

17. An access node (AN), comprising:
 radio front end circuitry; and
 processor circuitry coupled to the radio front end circuitry, and configured to:
  generate a radio link monitoring (RLM) or beam failure detection (BFD) reference signal (RS) configuration that indicates a target RLM/BFD RS for monitoring radio link or detecting beam failure;
  transmit the RLM/BFD RS configuration to a user equipment (UE);
  generate one or more tracking reference signal (TRS) configurations indicating one or more TRS; and
  transmit the one or more TRS configurations to the UE, wherein at least one of the one or more TRS is quasi co-located (QCLed) with the target RLM/BFD RS.

18. The AN of claim 17, wherein the processor circuitry is further configured to transmit, to the UE, at least one TRS that is quasi co-located (QCLed) with the target RLM/BFD RS.

19. The AN of claim 17, wherein the processor circuitry is further configured to transmit, to the UE, an RS that is different from the target RLM/BFD RS and is QCLed with the target RLM/BFD RS.

20. The AN of claim 17, wherein the processor circuitry is further configured to transmit, to the UE, the target RLM/BFD RS according to the RLM/BFD RS configuration.

\* \* \* \* \*